US011032278B2

(12) United States Patent
Xu

(10) Patent No.: US 11,032,278 B2
(45) Date of Patent: Jun. 8, 2021

(54) SYSTEM, METHOD AND APPARATUS FOR GENERATING DEVICE IDENTIFIER

(71) Applicant: BANMA ZHIXING NETWORK (HONGKONG) CO., LIMITED, Kowloon (HK)

(72) Inventor: Jun Xu, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 427 days.

(21) Appl. No.: 15/952,727

(22) Filed: Apr. 13, 2018

(65) Prior Publication Data

US 2018/0295133 A1 Oct. 11, 2018

Related U.S. Application Data

(63) Continuation-in-part of application No. PCT/CN2016/101539, filed on Oct. 9, 2016.

(30) Foreign Application Priority Data

Oct. 14, 2015 (CN) .......................... 201510661156.9

(51) Int. Cl.
*H04L 29/06* (2006.01)
*H04L 29/08* (2006.01)
(Continued)

(52) U.S. Cl.
CPC ........ *H04L 63/0876* (2013.01); *H04L 9/0822* (2013.01); *H04L 9/3213* (2013.01);
(Continued)

(58) Field of Classification Search
CPC ....... H04L 29/08; H04L 67/04; H04L 9/0822; H04L 9/3213; H04L 67/146;
(Continued)

(56) References Cited

U.S. PATENT DOCUMENTS 7,274,286 B2  9/2007  Tagato
2005/0065891 A1  3/2005  Lee
(Continued)

FOREIGN PATENT DOCUMENTS

CN  1494032  5/2004
CN  101296107  10/2008
(Continued)

OTHER PUBLICATIONS

X. Zhu, Y. Badr, J. Pacheco and S. Hariri, "Autonomic Identity Framework for the Internet of Things," 2017 International Conference on Cloud and Autonomic Computing (ICCAC), Tucson, AZ, 2017, pp. 69-79, doi: 10.1109/ICCAC.2017.14. (Year: 2017).*
(Continued)

*Primary Examiner* — Chau Le
(74) *Attorney, Agent, or Firm* — Van Pelt, Yi & James LLP

(57) ABSTRACT

A method for generating device identifiers, including: receiving an identifier assignment request; in response to the received identifier assignment request, assigning a device identifier to a device, the device identifier being a unique identifier, wherein the device is to be assigned with the
(Continued)

device identifier; and transmitting the device identifier to an identifier recording apparatus, wherein the identifier recording apparatus records the device identifier into the device.

21 Claims, 7 Drawing Sheets

(51) Int. Cl.
| | |
|---|---|
| *H04W 12/71* | (2021.01) |
| *H04W 12/126* | (2021.01) |
| *H04L 9/08* | (2006.01) |
| *H04L 9/32* | (2006.01) |
| *H04W 12/06* | (2021.01) |
| *H04W 12/0431* | (2021.01) |

(52) U.S. Cl.
CPC .......... *H04L 29/08* (2013.01); *H04L 63/0807* (2013.01); *H04L 67/04* (2013.01); *H04W 12/126* (2021.01); *H04W 12/71* (2021.01); *H04L 63/062* (2013.01); *H04L 63/0823* (2013.01); *H04L 2463/103* (2013.01); *H04W 12/0431* (2021.01); *H04W 12/06* (2013.01)

(58) Field of Classification Search
CPC ............. H04L 63/0876; H04L 63/0807; H04L 63/0823; H04L 63/062; H04L 63/06; H04W 12/00512; H04W 12/1206
See application file for complete search history.

(56) References Cited

U.S. PATENT DOCUMENTS

| | | | | |
|---|---|---|---|---|
| 2005/0231370 | A1* | 10/2005 | Tagato | G07F 7/1008 340/572.1 |
| 2010/0250946 | A1* | 9/2010 | Korte | H04L 63/0823 713/175 |
| 2012/0056712 | A1 | 3/2012 | Knode | |
| 2013/0166662 | A1 | 6/2013 | Daigle | |
| 2014/0181892 | A1* | 6/2014 | Von Bokern | H04L 63/102 726/1 |
| 2015/0095641 | A1* | 4/2015 | Drewry | H04L 9/3236 713/158 |
| 2018/0324170 | A1* | 11/2018 | Chen | G06F 21/44 |

FOREIGN PATENT DOCUMENTS

| | | |
|---|---|---|
| CN | 102055811 | 5/2011 |
| CN | 102594673 | 7/2012 |
| CN | 104394022 | 3/2015 |

OTHER PUBLICATIONS

S. Varakliotis, P. T. Kirstein and G. Deiana, "The use of Handle to aid IoT security," 2015 IEEE International Conference on Communications (ICC), London, 2015, pp. 542-548, doi: 10.1109/ICC.2015.7248378. (Year: 2015).*

* cited by examiner

SYSTEM, METHOD AND APPARATUS FOR GENERATING DEVICE IDENTIFIER

CROSS REFERENCE TO OTHER APPLICATIONS

This application is a continuation-in-part of and claims priority to International (PCT) Application No. PCT/CN16/101539 entitled METHOD, APPARATUS AND SYSTEM FOR GENERATING DEVICE IDENTIFIER, filed Oct. 9, 2016 which is incorporated herein by reference in its entirety for all purposes, which claims priority to China Patent Application No. 201510661156.9 entitled A METHOD, MEANS, AND SYSTEM FOR GENERATING DEVICE IDS, filed on Oct. 14, 2015 which is incorporated by reference in its entirety for all purposes.

FIELD OF THE INVENTION

The present invention generally relates to the field of computer communication technology and more particularly, to a system, method, and apparatus for generating device identifiers.

BACKGROUND OF THE INVENTION

An IMEI (International Mobile Equipment Identity) number is a string of electronic serial number of 15 digits, designed to individually correspond to and uniquely identify mobile phones such as GSM handsets, UMTS handsets, or satellite handsets. One IMEI number is globally unique from another, designating every mobile phone with an internationally unique identifier upon the mobile phone being manufactured. An IMEI number of a mobile phone is usually recorded and monitored by the manufacturer and/or service carrier in the process spanning from the device production to the activation by a user for operation at a network. An IMEI number functions similarly to an identification card. When a mobile phone is lost or stolen, the owner of the mobile phone can contact the service provider to request the mobile phone assigned with the IMEI number to be blocked from being used. The service provider will duly blacklist the mobile phone assigned with the IMEI number such that it can no longer access the network and therefore are rendered useless.

Presently, IMEI numbers are typically available for mobile phones. Although smart devices with network connectivity have become more popular and, currently most other types of devices do not have IMEI numbers or similar persistent and unique identifiers assigned thereto. Further, since usually only manufacturers are equipped with the authoritative knowledge of the IMEI numbers associated with the legitimate mobile phones, after a mobile phone is lost or stolen, the user often has to manually notify a service provider in order to request the IMEI number of the mobile device to be blacklisted by the service provider. From the perspective of other types of services available for various smart devices including mobile phones, it would be desirable to have a way for these service providers to verify the validity and legitimacy of the device by use of the IMEI numbers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to further clarify the goals, technical schemes, and advantages of the present invention, the present invention is described in detail below in light of the drawings and specific embodiments.

Figure 1:
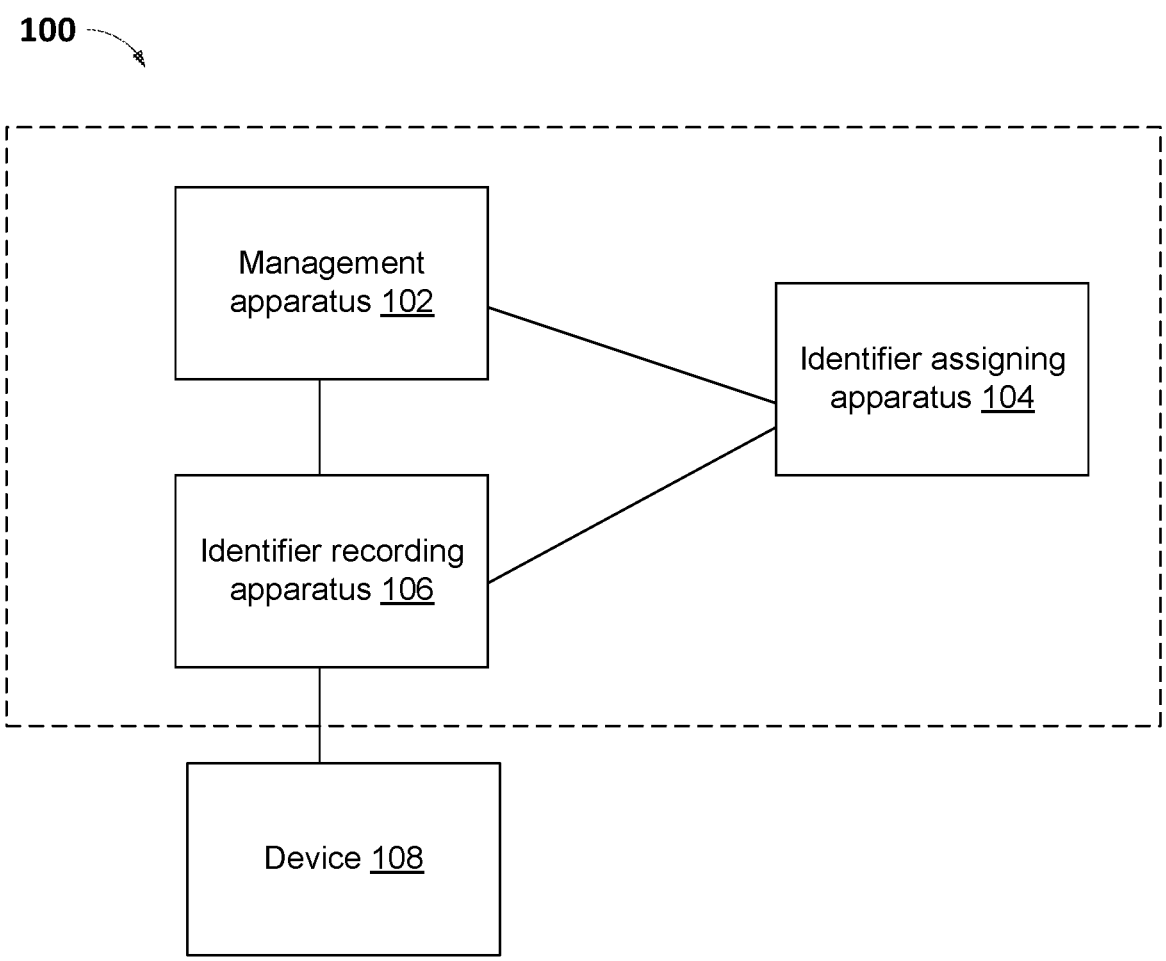
FIG. 1 is a schematic diagram of an example system for generating device identifiers, in accordance with one or more embodiments of the present disclosure.

FIG. 1 illustrates a schematic diagram of an example system for generating device identifiers, according to an embodiment of the present disclosure. System 100 includes a management apparatus 102, an identifier assigning apparatus 104, and an identifier recording apparatus 106. Also shown herein is a device 108, which is to be assigned with an identifier assigned by system 100. The identifier is recorded by identifier recording apparatus 106. Management apparatus 102, identifier assigning apparatus 104, and identifier recording apparatus 106 are in communication with each other via a wired and/or wireless communication network such as the Internet, an intranet, a LAN, a WAN, etc. In some embodiments, management apparatus 102 can be configured to be in direct communication with identifier assigning apparatus 106. For simplicity of illustration, only one management apparatus 102, one identifier assigning apparatus 104, one identifier recording apparatus 106, and one device 108 are shown herein. It should be understood that system 100 can include any number of management apparatus 102, any number of identifier assigning apparatus 104, any number of identifier recording apparatus 106, and can assign identifiers to any number of device 108. Management apparatus 102, identifier assigning apparatus 104, and identifier recording apparatus 106 can be implemented by, for example, a computing system 800 of FIG. 8.

In this example, management apparatus 102 is configured to locate at the side of the manufacturer of device 108, and therefore can also be termed "manufacturer management apparatus." In some embodiments, management apparatus 102 can be configured at any suitable locations where devices, or components of the devices are in a ready condition to be assigned with unique identifiers. Such locations can include, for example, sites and facilities where devices are ready for shipment, and the like. As used herein, the term "manufacturer" refers to any entity having the authorities to request for identifiers to be assigned to devices, and to record the devices with corresponding assigned identifiers. In some embodiments, a manufacturer is the manufacturer of the devices. In some other embodiments, a manufacturer is a carrier, a service provider, or a dealership with regard to various aspects of device usage and the like.

In this example, identifier assigning apparatus 104 is located at a security platform; and identifier recording apparatus 106 is located at the manufacturer's site. A security platform is also configured with tasks such as verifying and authenticating various users and devices of the users. It should be understood that both assigning apparatus 104 and identifier recording apparatus 106 can be configured to reside at any suitable point or location. For example, identifier assigning apparatus 104 can be configured at a stand-alone server, a collection of servers, or a cloud service, all of which are independent from but in communication with the security platform which performs user/device identification verification and/or authentication. For another example, identifier recording apparatus 106 can operate at an independent facility specialized in recording identifiers into devices manufactured from one and/or multiple manufacturers. In some embodiments, a manufacturer can be authorized to operate management apparatus 102 and identifier assigning apparatus 104 to assign identification information to device 108, as well as identifier recording apparatus 106 to record the identification information.

Management apparatus 102 is configured to manage various aspects relating to devices during the production process. In terms of assigning identifiers to device 108, management apparatus 102 is configured to perform functionalities including the following. First, management apparatus 102 is configured to transmit to identifier assigning apparatus 104 (e.g., a security platform) an identifier assignment request for device 108, which is to be provisioned with an assigned identifier. Second, management apparatus 102 is configured to maintain and manage various device information such as device model information, system (e.g., operating system, firmware system, etc. that execute on a device) version information, identification information (e.g., chip series code) of a chip of device 108, and the like. In some embodiments, the information of device 108 is included in the afore-described identifier assignment request transmitted from management apparatus 102 to identifier assigning apparatus 104.

Identifier recording apparatus 106 is configured to receive unique device identifiers generated by identifier assigning apparatus 104 (e.g., the security platform) for devices (e.g., device 108), which is to be assigned and recorded with unique identifiers. Once in receipt of the identifiers from identifier assigning apparatus 104, identifier recording apparatus 106 is configured to record the received device identifier into device 108. Any suitable techniques can be implemented to record an identifier into device 108. For example, a device identifier can be burned into the chips of the device; stored at the non-volatile memory (e.g., NADN flash memory) of the device, or any technique that allows an identifier to be permanently stored and later retrieved from the device by a user, a software application, another hardware component, and the like.

Identifier assigning apparatus 104 (e.g., the security platform) is configured to generate unique device identifiers that uniquely correspond to and identify devices. As illustrated in further details with reference to FIG. 7, identifier assigning apparatus 104 can be implemented at a server or at a server farm. In some embodiments, identifier assigning apparatus 104 can be implemented at one or more cloud infrastructures. In some embodiments, identifier assigning apparatus 104 can also be implemented as virtual machines distributed at various computing resources to achieve a scalable, adaptable, and load balanced architecture in terms of assigning identifiers.

Identifier assigning apparatus 104 is configured to receive the above-described identifier assignment request transmitted from management apparatus 102, and subsequently to generate a unique device identifier corresponding to device 108. Afterwards, identifier assigning apparatus 104 is further configured to transmit the generated device identifier to identifier recording apparatus 106.

According to various embodiments of the present disclosure, device 108 can be a single device, a component of a device, a composite device having multiple components, or the like. For example, device 108 can include a mobile phone, a computer, a smart household device, a wearable device, a smart medical device, an in-vehicle device, etc. A mobile phone device can include, for example, a smart phone or a conventional flip-phone. A computer device can include, for example, a server computer, a personal computer, a notebook computer, a tablet computer, and the like. A smart household device can include, for example, a smart television set, a smart air-conditioning system, a smart humidifier, a smart water heater, a smart kitchen appliance, a mart ventilation system (e.g. a smart door and a smart window), a smart air purifier, a smart home security system, and the like. A wearable device can include, for example, a smart watch, a pair of smart glasses, a smart wrist-band, a piece of smart clothing, smart shoes, smart accessories, and the like. A smart medical device can include, for example, a smart blood pressure gauge, a smart bodyweight scale, a smart blood sugar meter, a smart massage seat, a smart bio-metrics monitor, and the like. An in-vehicle device can include, for example, a smart on-board information system for traffic information, cellular communication, vehicle diagnosis, navigation system, warning system, emergency system, entertainment system, and the like.

Figure 2:
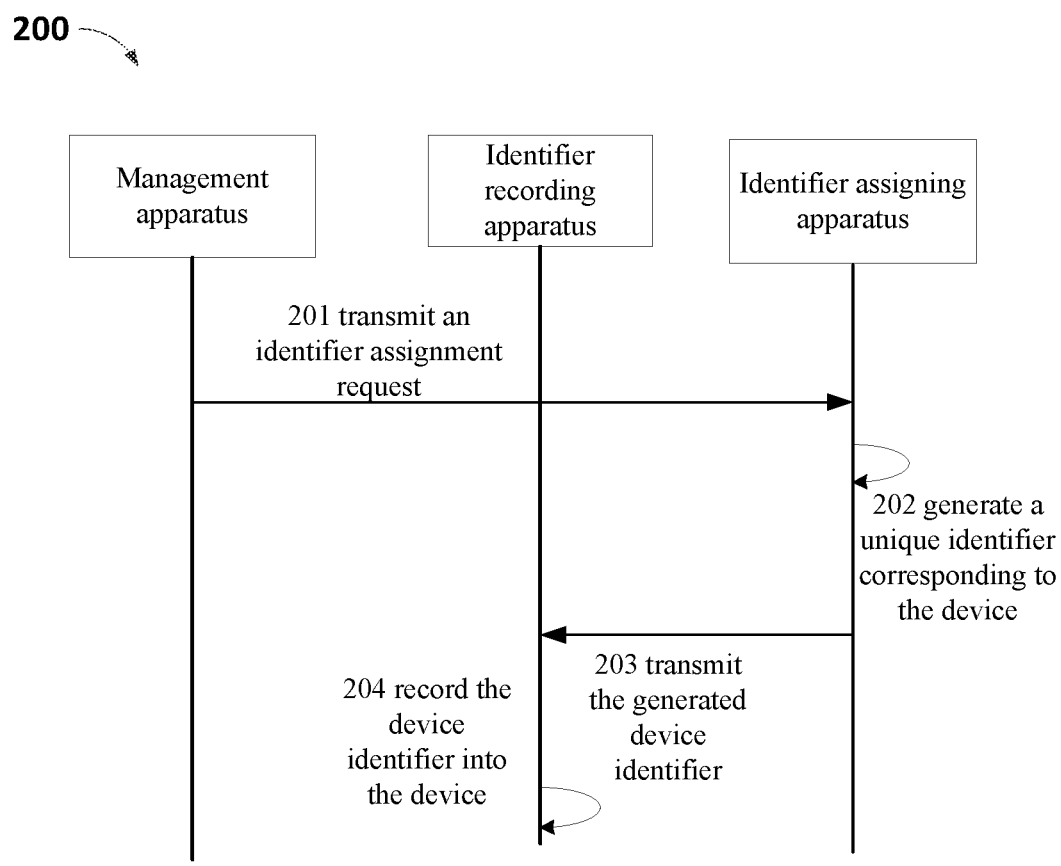
FIG. 2 is a flowchart illustrating an example process for generating device identifiers, in accordance with one or more embodiments of the present disclosure.

FIG. 2 illustrates a flowchart of an example process for generating device identifiers according to an embodiment of the present disclosure. Process 200 can be implemented by, for example, the collaboration of management apparatus 102, identifier assigning apparatus 104, and identifier recording apparatus 106 of FIG. 1.

Process 200 starts at 201, where a management apparatus transmits an identifier assignment request to an identifier assigning apparatus (e.g., a security platform).

The identifier assignment request is configured to include information that is utilized by the identifier assigning apparatus to generate unique device identifiers. In some embodiments, the identifier assignment request includes various information relating to the device to be assigned and recorded with a unique identifier. Such device information includes, for example, device model information, system version (e.g., operating system version and firmware version, etc.) information, identification information (e.g., chip series code) of a chip of the device, and the like. In some other embodiments, the identifier assignment request can also include information pertaining to the quantity of the devices to be assigned with the requested identifiers per identifier assignment request. In some embodiments, the identifier assignment request can include date and time information, as well as geographical information.

At 202, the identifier assigning apparatus (e.g., the security platform) generates a unique device identifier corresponding to the device that is to be assigned with the identifier.

In some embodiments, the identifier assigning apparatus generates a device identifier for the device to be assigned with an identifier based on the above-described device information that is included in the identifier assignment request. The generated device identifier globally and uniquely identifies a particular device such that the particular device can be distinguished from other devices based on the generated identifier. Any suitable technique for generating unique identifiers can be used herein without limitation. An example process to generate device identifiers is illustrated in further details below with reference to FIG. 3.

In some embodiments, when the device information is not available or not made available, the identifier assigning apparatus uses other ways to generate device information. For example, it can use generated random numbers in place of the device information. In implementation, any appropriate technique can be applied herein so long as it ensures the uniqueness of the generated information (e.g., the device information) that is to be utilized in the process of generating device identifiers.

In some embodiments, in addition to generating device identifiers in response to (e.g., in real time response to) receiving identifier assignment requests, the identifier assigning apparatus is further configured to generate a pool of unique identifiers beforehand. In this way, upon receiving an identifier assignment request, the identifier assigning apparatus assigns one device identifier out of the pool of identifiers as the unique device identifier corresponding to the request and to the device to be assigned with the identifier.

At 203, the identifier assigning apparatus transmits the generated device identifier to an identifier recording apparatus.

In some embodiments, the identifier assigning apparatus transmits the generated device identifier directly to the identifier recording apparatus. In some other embodiments, the identifier assigning apparatus transmits the generated device identifier to the management apparatus, which in turn transmits the generated device identifier to the identifier recording apparatus.

At 204, the identifier recording apparatus records the generated device identifier into the device to be assigned with the identifier.

In some embodiments, the identifier recording apparatus is configured to record the device identifier to the chip of the device by storing the identifier to a non-volatile memory of the chip, or using other suitable technique that allow an identifier to be permanently recorded and later retrieved. A device identifier recorded into a device is permanently associated with the device and cannot be altered. When it is necessary or needed, the device or other entities can inquire about the device identifier and use the identifier to validate the identity and the legitimacy of the device.

As shown in FIGS. 1-2, a device manufacturer is no longer required to be in charge of generating device identifiers for the device manufactured thereby. In contrast to various manufacturers being tasked to recording identifiers to manufactured devices, the generating of device identifiers is centralized at a network-connected entity such as a security platform, which is also optionally configured with other tasks such as to verify and authenticate user identities and device identities. This way, an identifier assigning apparatus (e.g., a security platform) is configured to uniformly generate and maintain records of unique device identifiers for various devices manufactured by various manufacturers. In other words, the identifier assigning apparatus in a uniform manner stores and maintains the information used to prove the legitimacy of individual devices.

Figure 3:
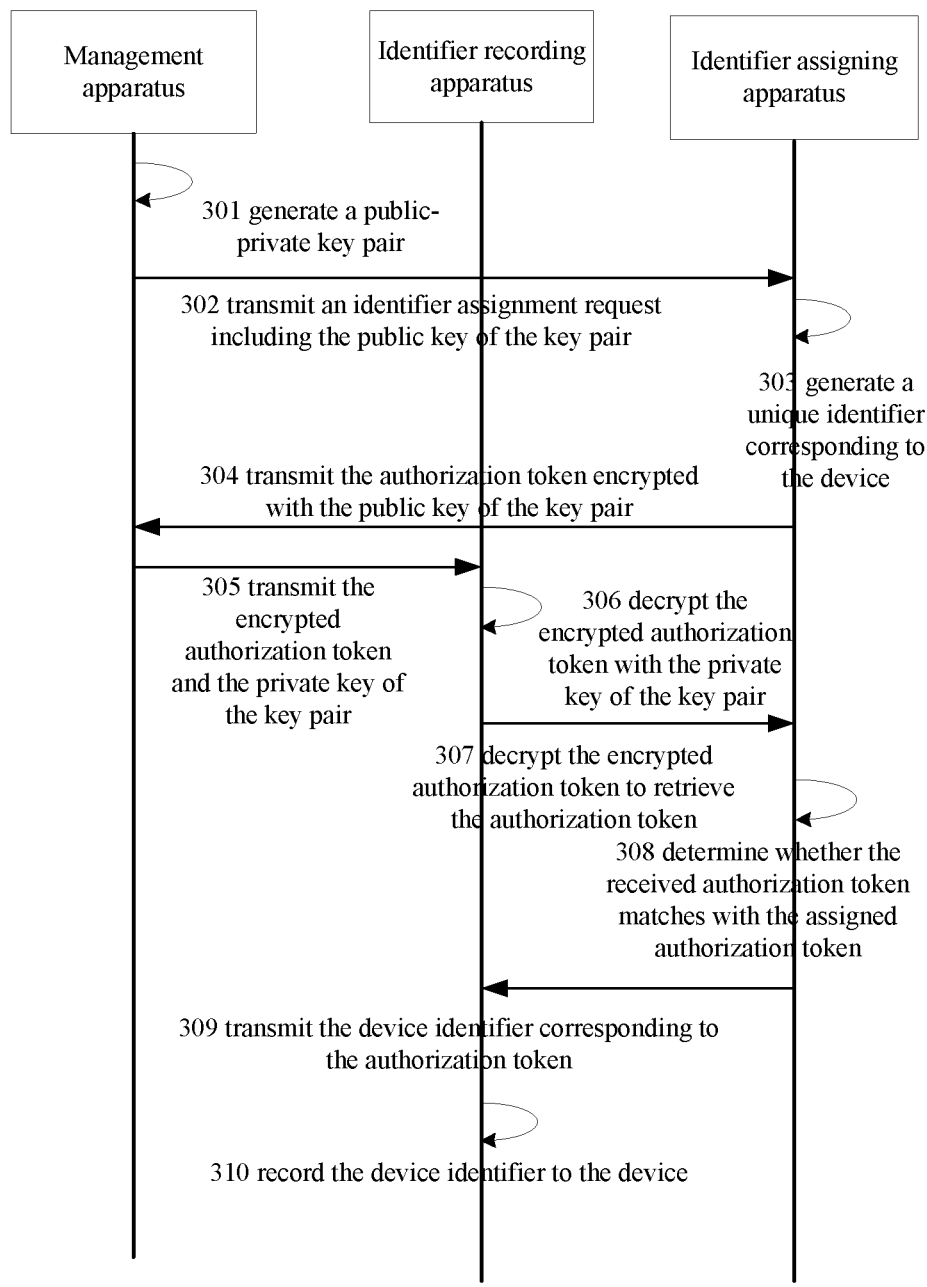
FIG. 3 is a flowchart illustrating another example process for generating device identifiers, in accordance with one or more embodiments of the present disclosure.

FIG. 3 illustrates a flowchart of another example process for generating device identifiers according to an embodiment of the present disclosure. Process 300 can be implemented by configuring, for example, management apparatus 102, identifier assignment apparatus 104, and identifier recording apparatus 106 of FIG. 1 to collaborate. Process 300 starts at 301, where a management apparatus at the manufacturer side is configured to generate a public-private key pair (e.g., RSA key pair).

At 302, the management apparatus is configured to include both the device information and the public key of the public-private key pair in an identifier assignment request, and transmit the request to an identifier assigning apparatus (e.g., a security platform).

At 303, the identifier assigning apparatus is configured to generate a unique device identifier corresponding to the device to be assigned with an identifier, as well as an authorization token, which is described in further detail in below.

In some embodiments, the identifier assignment request includes the information of the number of devices to be assigned with identifiers per identifier assignment request. If the information indicates that there is more than one device to be assigned with an identifier, e.g., n devices (where n>1), the identifier assigning apparatus generates n device identifiers corresponding to the n devices. In some embodiments, an authorization token is individually generated for each of the n devices to be assigned with identifiers. In some other embodiments, a single authorization token is generated for the collection of the n devices to be assigned with identifiers. In some embodiments, the identifier assigning apparatus (e.g., the security platform) is further configured to maintain a mapping relationship between the generated device identifiers and the corresponding authorization tokens.

In some embodiments, a pre-configured rule or policy is utilized to generate unique device identifiers. Any suitable techniques can be implemented herein as long as the uniqueness of device identifiers are achieved across devices. In some embodiments, suitable techniques to generate identifiers achieve the goal that the chance of two devices being assigned with the same identifier is extremely small, or next to negligible. For example, a pre-configured rule can specify a device identifier to be generated in a specific format to represent an individual device uniquely. The data format can be defined to include, for example, a field of a number of bytes describing the device type, e.g., mobile phone devices, IoT (Internet of Things) devices, in-vehicle devices, etc.; a field of a number of bytes describing the manufacturer of the device or a representation of the manufacture of the device; and a field of a number of bytes describing serial code of a chip of the device. In some embodiments, the data format is extensible.

In some embodiments, an example device identifier is defined in the format of a multi-bit string of characters and/or digits at a length of 17, and stored in 8 bytes. Such format can be defined as, for example, in the form of "Y-AAAA-BBBB-XXXXXXXX." In this example, the first character "Y" is specified to comprise a designated character (prefix) to indicate that the identifier string is designated as a device identifier. The following four characters "AAAA" are specified in hexadecimal representations to describe a manufacturer (e.g., a serial code designated to indicate the manufacturer). The next four characters "BBBB" are also specified in hexadecimal representations to include information such as a chip model number, or chip series number relating to a chip of the device to be assigned with an identifier. Conventionally, manufacturers of chips assign an identifier to each chip that they create. Also, these four characters can further include information such as a system version number, or the number of devices that are in need of identifier assignment per identifier assignment request. The last eight characters "XXXXXXXX" are specified to encode in hexadecimal representations a series of random numbers.

Any suitable technique can be implemented herein to generate a series of random number without limitation. Although it is generally appreciated that truly random numbers are difficult to generate, in some embodiments, one or more seed or secret seed values can be used to perturb an algorithmic pseudo-random number generator ("PNRG"), allowing the generation of improved random (or pseudo-random) numbers. The one or more seed or secret seed values can be obtained or derived from random information or information pertaining to time, date, and/or geographical data. It should be understood that, according to various embodiments of the present disclosure, a device identifier can be a string of any mummer of digits, any number of characters, and any combination thereof. In some embodiments, device information other than the chip series numbers or the system version information are included in the identifier.

Authorization tokens are generated based on the information such as dates, time, device information, manufacturer information, random numbers, and any combination thereof. Alternatively, in addition to generating authorization tokens in response to (e.g., in real time response to) an identifier assignment request at 303, a pool of pre-created authorization tokens is maintained so that an authorization token designated as assignable can be allocated and assigned at 303. In this implementation, once assigned out of the pool of authorization tokens, that particular authorization token is designated as unassignable in the pool. As described in greater detail below at 309, after the device identifier corresponding to the authorization token is assigned at 309, the authorization token is recycled back to the pool of authorization tokens by, for example, being designated as assignable again in the pool. This way, the authorization tokens in the pool can be assigned out in response to an identifier assignment request again without the need to generate new authorization tokens.

At 304, the identifier assigning apparatus encrypts the authorization token with the public key of the public-private key pair received in the identifier assignment request; and subsequently transmits the encrypted authorization token to the management apparatus.

At 305, the management apparatus in turn transmits the received encrypted authorization token and the private key in the public-private key pair to an identifier recording apparatus. As the public key of the public-private key pair is used to encrypt the authorization token by the identifier assigning apparatus, the private key of the public-private key pair is the key to decrypt the encrypted authentication token, and is needed by the identifier recording apparatus to decrypt the authentication token.

At 306, the identifier recording apparatus utilizes the received private key to decrypt the encrypted authorization token such that to retrieve the authorization token.

At 307, the decrypted authorization token is transmitted back to the identifier assigning apparatus. As the purpose of encrypting authorization tokens is to ensure data security for the authorization tokens, in some embodiments, the authorization token is encrypted using other suitable security measurements. Nevertheless, in some other embodiments, the authorization token can be transmitted without being encrypted or protected with any security measurements when the identifier assigning process is performed via secure communication channel or path.

At 308, the identifier assigning apparatus is configured to determine whether the received authorization token matches with the generated authorization token. If so, process 300 continues onto 309. Otherwise, process 300 concludes here. In some embodiments, an error message is transmitted to the management apparatus or to the identifier recording apparatus, as a result of the process 300 not proceeding to 309.

At 309, the identifier assigning apparatus is configured to transmit the device identifier corresponding to the authorization token to the identifier recording apparatus. In some embodiments where the identifier assignment request includes a number of n devices to be assigned with identifiers and where one single authorization token is associated with the n devices, the device identifiers corresponding to the n devices are all transmitted to the identifier recording apparatus.

At 310, the identifier recording apparatus is configured to record the device identifier onto the device that need to be assigned with identifiers. The recording of identifiers is similar to the above-illustrated with reference to 204 of FIG. 2, and is not repeated herein.

Alternatively, at 309, the identifier assigning apparatus is further configured to generate secret encryption key information and transmit the entire or a part of the encryption key information, along with the device identifier, to the identifier recording apparatus. The identifier recording apparatus in turn records both the received device identifier and the encryption key information (e.g., the complete or the partial encryption key information) into a device (e.g., the chip of the device) that is to be assigned with an identifier. In some other embodiments, the identifier assigning apparatus is configured to generate a secret cryptographic key. In addition to safekeeping the secret cryptographic key, the identifier assigning apparatus transmits the secret cryptographic key along with the device identifier to the identifier recording apparatus. In some embodiments, the identifier assigning apparatus is configured to generate a public-private key pair (e.g., using a security library). In addition to safekeeping the key pair, the identifier assigning apparatus transmits either the public key or the private key of the public-private key pair along with the device identifier to the identifier recording apparatus, which in turn record both the key and the identifier into the device that is to be assigned with an identifier.

At the identifier recording apparatus side, the device identifier can be recorded together with the above-described encryption related key information into a secure storage of the device to ensure information security. In some embodiments, a secure storage is a secure execution environment that is implemented to securely hosting applications, confidential and cryptographic data, and the like. Any suitable mechanisms can be applied herein without limitation. For example, a secured storing can be implemented by use of mechanisms such as ARM TrustZone™, Secure Element™, Texas Instrument M-Shield™, Intel's TXT (Trusted Execution Technology™), or the like. In some embodiments, a secure storage is a virtualized secured execution environment that is implemented by use of mechanisms such as AMD's Secure Virtual Machine™, and the like. The recordation of information at a secure storage achieves the goal that, once recorded into a device, the identifier and encryption related information becomes permanently attached to the device, not to be altered or deleted or otherwise tampered with.

It should be noted that at 301, it is the management apparatus that is in charge of generating and safekeeping the encryption key related information. The use of a public-private key pair is to illustrate the example application of asymmetrical encryption algorithm in process 300. According to various embodiments of the present disclosure, any suitable encryption algorithms and mechanisms can be utilized without limitation. For example, when a symmetrical encryption algorithm is utilized, the management apparatus generates a secret key at 301, and at 302, transmits the secret key to the identifier assigning apparatus as a part of the identifier assignment request. At 304, the identifier assigning apparatus transmits the authentication token to the management apparatus after encrypting the token with the secret key received from the management apparatus. Subsequently at 305, the management apparatus provides the secret key to the identifier recording apparatus so that the identifier recording apparatus uses the secret key to decrypt the encrypted authorization token at 306.

In some embodiments, blockchain-based technology or any suitable distributed ledger technology can be implemented in process 300 when encryption related information is to be generated. Hybrid blockchain-based technology can also be applied to process 300 without limitation.

Figure 4:
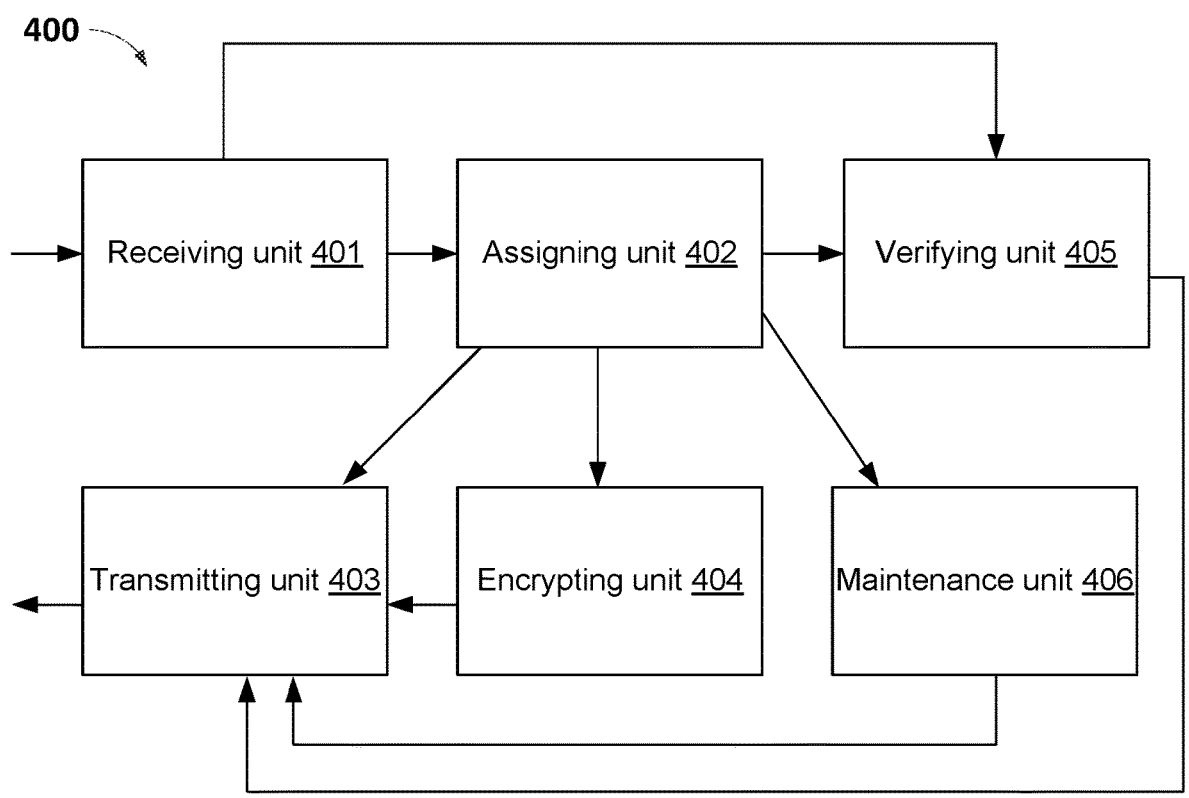
FIG. 4 is a functional diagram of an example identifier assigning apparatus, in accordance with one or more embodiments of the present disclosure.

FIG. 4 illustrates a functional diagram of an example identifier assigning apparatus in accordance with an embodiment of the present disclosure. In some embodiments, an identifier assigning apparatus 400 is configured to locate at a security platform, which is in charge of verifying the identities of users and devices in connection to providing services to the users using the devices. For example, such services can be online e-commerce transactions, automated home services, personal health monitoring services, and the like. As shown herein, identifier assigning apparatus 400 includes a receiving unit 401, an assigning unit 402, a transmitting unit 403, an encrypting unit 404, a verifying unit 405, and a maintenance unit 406. Most of the functionalities performed by receiving unit 401, assigning unit 402, transmitting unit 403, encrypting unit 404, verifying unit 405, and maintenance unit 406 are similar to those above-described with references to FIGS. 1-3. Therefore, for simplicity of illustration, details of these functionalities are not repeated herein.

Receiving unit 401 is configured to receive an identifier assignment request. The identifier assignment request can be transmitted by a management apparatus (not shown). Assigning unit 402 is configured to assign a unique device identifier corresponding to a device that is to be assigned with an identifier. In some embodiment, assignment unit 402 is configured to generate a unique device identifier. Again, as the generating of identifiers based on data such as device information included in the identifier assignment request, and the generating of identifiers according to pre-determined rules including these that define a specific format for device identifiers are substantially similar to those above-described with reference to FIGS. 1-3, for simplicity of illustrations, details of these functionalities are not repeated herein.

Alternatively, after receiving unit 401 receives the identifier assignment request, assigning unit 402 is configured to assign a device identifier from a pre-generated pool of device identifier. Further, assigning unit 402 is also configured to generate an authorization token corresponding to the generated device identifier. Again, the generating of authorization tokens is substantially similar to those above-described with reference to FIGS. 1-3, for simplicity of illustrations, details of these functionalities are not repeated herein. Alternatively, assigning unit 402 can also be configured to assign, from a pool of pre-generated authorization tokens, an authorization token designated as assignable as the corresponding authorization token. The assigned authorization token is subsequently designated as un-assignable in the pool of authorization tokens.

Transmitting unit 403 is configured to transmit the device identifier to an identifier recording apparatus to have the device identifier recorded into the device to be assigned with an identifier.

To provide enhanced security, an identifier assignment request can also include encryption key related information. In this example, assigning unit 402 is further configured to generate or assign the authorization token for transmitting unit 403 to transmit to the device to be assigned with an identifier. This way, when receiving unit 401 receives the authorization token from an identifier recording apparatus, verifying unit 405 is configured to determine whether the authorization token received is consistent with the one generated by assigning unit 402. If so, transmitting unit 403 is triggered to transmit the generated device identifier.

Furthermore, encrypting unit 404 is configured to encrypt the authorization token with secret encryption key related information. Transmitting unit 403 sends the encrypted authorization token to the management apparatus. The management apparatus is configured to provide the encrypted authorization token and encryption key related information to the identifier recording apparatus. Receiving unit 401 receives the decrypted authorization token sent by the identifier recording device, which retrieves the decrypted authorization token by decrypting the encrypted authorization token.

Maintenance unit 406 is configured to record the mapping relationships between the authorization token and corresponding device identifier generated for the device. Transmitting unit 403 is configured to transmit the device identifier corresponding to the matching authorization token received by receiving unit 401 to the identifier recoding apparatus.

In some embodiments, the encryption key information included in the identifier assignment request can be the public key in the public-private key pair generated by the management apparatus. The secret key information provided by the management apparatus to the identifier recording apparatus can be the private key in the public-private key pair.

In addition, assigning unit 402 is further configured to generate encryption key related information to be transmitted along with the device identifier to the identifier recording apparatus. Transmitting unit 403 is configured to send all or a part of the encryption key related information together with the device identifier to the identifier recording apparatus. In embodiments where assigning unit 402 uses a symmetrical encryption algorithm to generate encryption key related information, transmitting unit 403 is configured to send the entire encryption key related information (e.g., the secrete key) together with the device identifier to the identifier writing device.

In embodiments where assigning unit 403 employs an asymmetrical encryption algorithm to generate encryption key related information, transmitting unit 403 is configured to send either the public key or the private key of the public-private key pair corresponding to the authorization token generated by assigning unit 402 to the identifier recording device.

Figure 5:
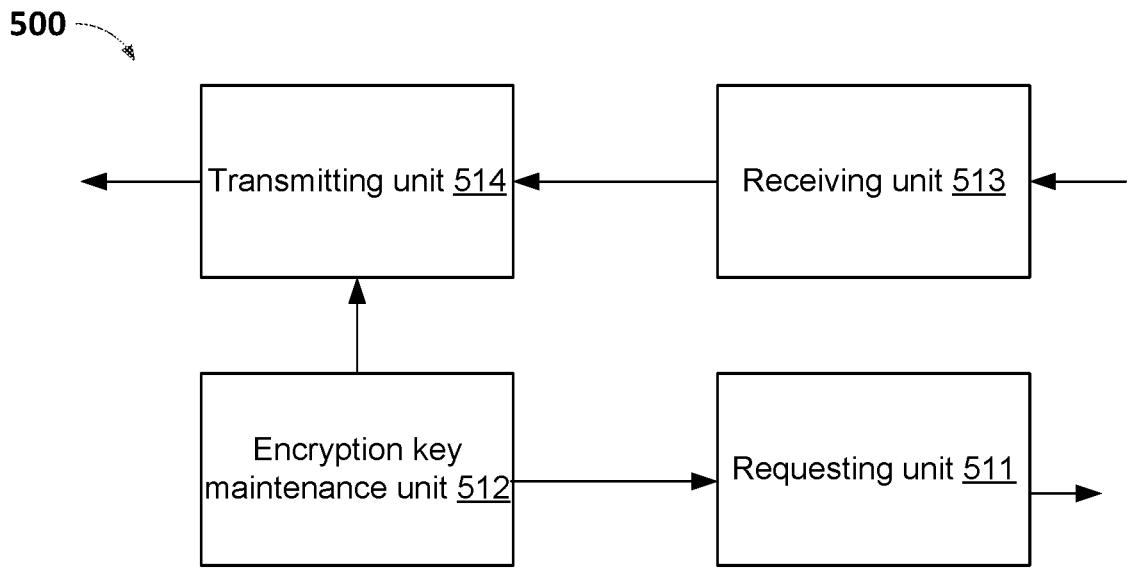
FIG. 5 is a functional diagram of an example management apparatus, in accordance with one or more embodiments of the present disclosure.

FIG. 5 illustrates a functional diagram of an example management apparatus in accordance with an embodiment of the present disclosure. In this example, management apparatus 500 is configured to locate at a site of manufacturer. As shown herein, management apparatus 500 includes a requesting unit 511, an encryption key maintenance unit 512, a receiving unit 513, and a transmitting unit 514. Again, most of the functionalities performed by requesting unit 511, encryption key maintenance unit 512, receiving unit 513, and transmitting unit 514 are similar to those above-described with references to FIGS. 1-3. Therefore, for simplicity of illustration, details of these functionalities are not repeated herein.

Requesting unit 511 is configured to transmit an identifier assignment request to an identifier assigning apparatus (e.g., a security platform) to request a unique device identifier to be generated in response to the request. Details of the embodiments of the identifier assignment request are similar to those above-described with reference to FIGS. 1-3, and therefore are not repeated herein.

Encryption key maintenance unit 512 is configured to safe keep the encryption key information and include the encryption key information in the identifier assignment request. Receiving unit 513 is configured to receive the authorization token encrypted by the encryption key information and transmitted from the identifier assigning apparatus. Transmitting unit 514 is configured to send the encrypted authorization of token and encryption key information to an identifier recording apparatus.

In some embodiments, encryption key maintenance unit 512 is configured to employ a symmetrical encryption algorithm, in which case the encryption key information is a secret encryption key. In some embodiments, encryption key maintenance unit 512 is configured to employ an asymmetrical encryption algorithm, in which case the encryption key information can be, for example, a public-private key pair. Using the latter type of encryption, the encryption key information included in the identifier assignment request is the public key of the public-private key pair, and the encryption key information sent by transmitting unit 514 to the identifier recording apparatus is the private key of the public-private key pair.

Figure 6:
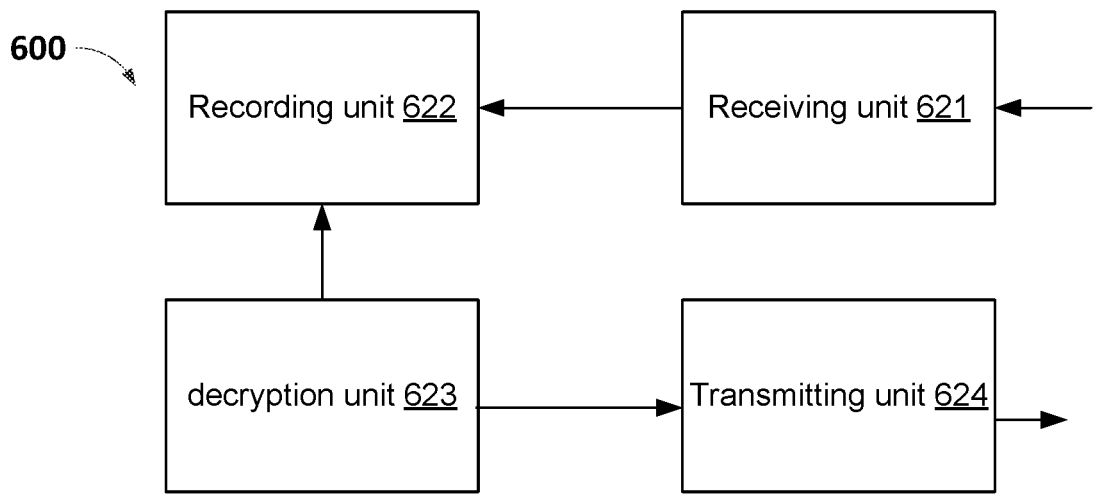
FIG. 6 is a functional diagram of an example device identifier recording apparatus, in accordance with one or more embodiments of the present disclosure.

FIG. 6 illustrates a functional diagram of an example identifier recording apparatus in accordance with an embodiment of the present disclosure. Identifier recording apparatus 600 includes a receiving unit 621, a recording unit 622, a decrypting unit 623, and a transmitting unit 624. Again, most of the functionalities performed by receiving unit 621, a recording unit 622, a decrypting unit 623, and a transmitting unit 624 are similar to those above-described with references to FIGS. 1-3. Therefore, for simplicity of illustration, details of these functionalities are not repeated herein.

Receiving unit 621 is configured to receive the unique device identifiers generated by an identifier assigning apparatus (e.g., a security platform) for devices to be assigned with identifiers. Recording unit 522 is configured to record device identifiers into devices to be assigned with identifiers.

As described above, in addition to generating device identifiers, the identifier assigning apparatus generates the authorization tokens and encrypts the authorization tokens with the encryption key related information transmitted from the management apparatus. Accordingly, receiving unit 621 is configured to receive the encrypted authorization tokens and encryption key information from the management apparatus. Decrypting unit 623 is configured to use the encryption key information to decrypt the encrypted authorization tokens. In turn, transmitting unit 624 is configured to send the decrypted authorization tokens to the identifier assigning apparatus. Once the identifier assigning apparatus verifies that the received decrypted authorization token matches with the authorization token generated thereby, the identifier assigning apparatus sends the device identifier corresponding to verified authorization token to the identifier recording device.

As described above, the identifier assigning apparatus also generates and maintains the encryption key information. Thus, the identifier assigning apparatus transmits the generated device identifiers as well as the entire or part of the encryption key information to the identifier recording apparatus. In turn, receiving unit 621 is also configured to receive such entire or partial encryption key information sent together with the device identifiers from the identifier assigning apparatus; and recording unit 622 is also configured to record the received entire or partial encryption key information into devices for which the identifiers are generated.

It should be understood that although the above-described communication between the management apparatus, the identifier assigning apparatus, and the identifier recording apparatus are illustrated in an example manner of direct communication, such communication can also be implemented via any suitable communication links via any suitable networks, for example, via the relaying of information by networked devices situated along the communication path between the management apparatus, the identifier assigning apparatus, and the identifier recording apparatus.

In some embodiments, the device identifiers generated can be utilized by a security platform to authenticate or verify the validity of devices. For example, if a device identifier retrieved by a device is determined as matching with the device identifier generated and maintained by the security platform, the device with that particular identifier is determined as a valid device. Applications of such device authentication include, for example, the activations of devices, the downloading of business data or personal data to devices, and the storing or uploading of data from devices to a data storage infrastructure such as a cloud. As illustrated herein, with the identifier based verification and authentication of a device, it is only upon a security platform's successful authenticating of a device that the device can be activated to register with the network for operation, business or personal data can be downloaded to the device, data can be uploaded from the device to a cloud service.

In addition, with regard to the security platform, the functions described above could be completed by a server or by a farm of servers. The following describes the architecture for implementing a server farm.

Figure 7:
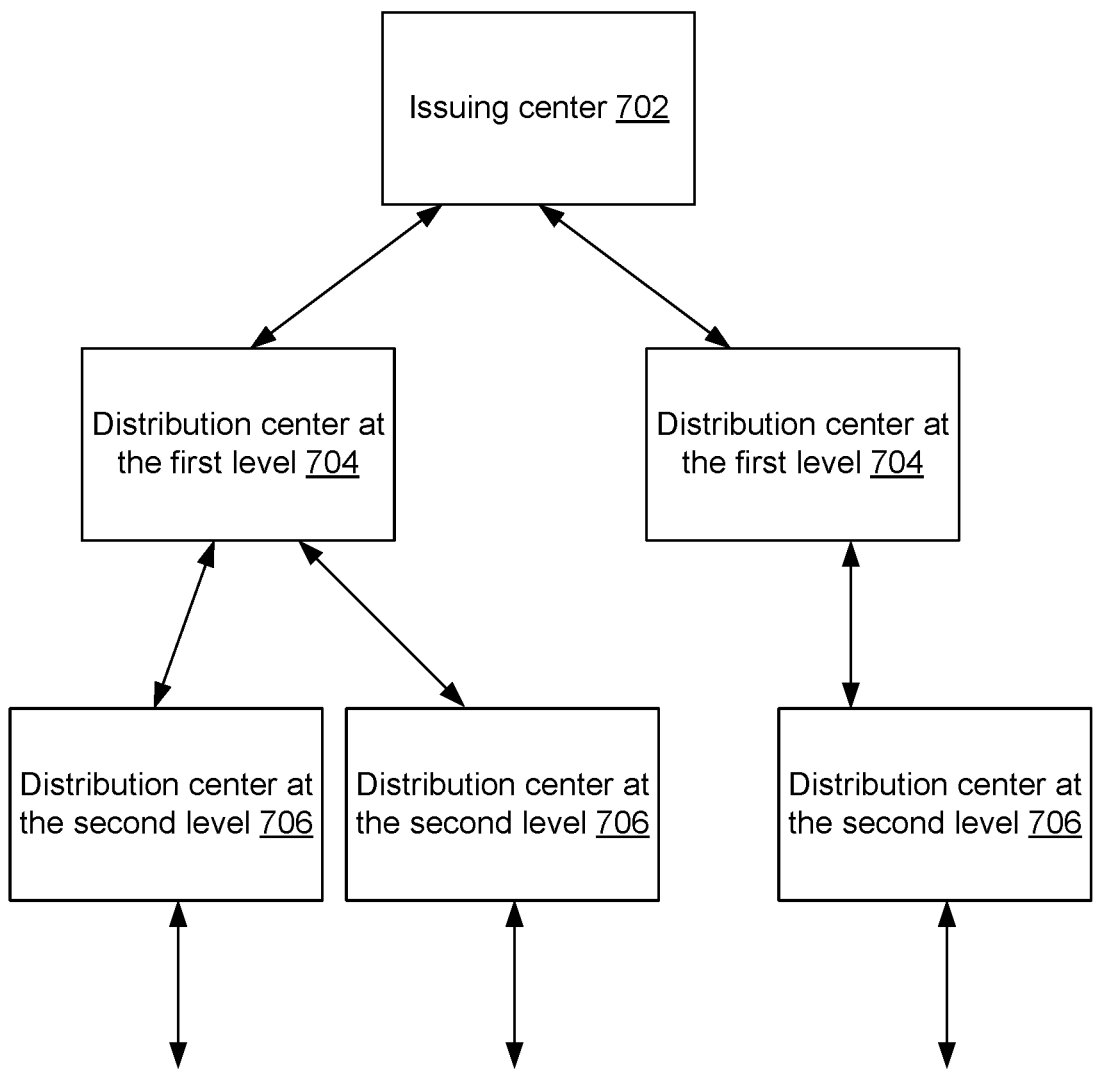
FIG. 7 is a schematic diagram illustrating an example architecture of an identifier assigning apparatus for generating device identifiers, in accordance with one or more embodiments of the present disclosure.

FIG. 7 illustrates a structural diagram of an example architect of an identifier assigning apparatus in accordance with an embodiment of the present disclosure. In this example, the identifier assigning apparatus is implemented at a security platform that comprises a server farm. The security platform 700 includes an issuing center 702 and one or more distribution centers 704 and 706 at various distribution levels. For simplicity of illustration, only two distribution levels are illustrated, and it should be understood that any number of levels, any number of corresponding distribution centers, and any number of issuing center 702 can be included in security platform 700 without limitation.

To prevent the generating of duplicated device identifiers, issuing center 702 is configured to as a centralized entity for issuing identifier generating rules, which is distributed to the corresponding distribution centers 704 and 706 at all levels. Distribution centers 704 and 706 are configured to receive identifier assignment requests from individual manufacturers or individual management apparatus; and subsequently to generate device identifiers based on the identifier generating rules specified by issuing center 702. Distribution centers 704 and 706 are further configured to transmit the generated identifier to the devices for being recorded into the devices. Additionally, distribution centers 704 and 706 at all levels are further configured to submit the generated device identifiers to issuing center 702 for centralized record keeping and maintenance. This way, issuing center 702 is configured to authorize distribution centers 704 and 706 at all the levels to generate device identifiers, while issuing center 702 is only configured to establish and issue the identifier generating rules, as well as to maintain a uniform record of all the generated and reported device identifiers at a centralized entity. In some embodiments, issuing center 702 can store the reported device identifiers and/or related encryption related information in one or more databases.

In some embodiments, issuing center 702 is configured to specify, in the identifier generating rule issued to distribution centers 704 and 706 at all levels, information including, for example, the length of a device identifier, the content corresponding to each field in an identifier, and the like. Take the above-described identifier format of "Y-AAAA-BBBB-XXXXXXXX" for example, in addition to issuing the format of "Y-AAAA-BBBB-XXXXXXXX" in the identifier generating rule to distribution centers 704 and 706 at all levels, issuing center 702 is configured to assign different ranges of the random numbers to different distribution centers 704 and 706, respectively. Accordingly, distribution centers 704 and 706 at all levels are configured to generate random numbers within the specified corresponding ranges, which are in turn used in the process of generating device identifiers. In some embodiments, the levels of distribution centers can be extended in response to a growing number of devices that need to be assigned with identifiers. In this case, the identifier generating rules can be updated accordingly to accommodate additional distribution centers and to ensure no duplicated identifiers are to be generated at distribution centers.

With the use of the collaboration amongst issuing center 702 and various distribution centers 704 and 706 at all levels, the task of generating device identifiers is distributed to various distribution centers 704 and 706, contributing to easing up the requirement of computational power for one single server (issuing center 702) to multiple servers (distribution centers 704 and 706) with load-balancing capabilities. Nevertheless, such tiered architect of security platform 700 also achieves the centralized capabilities to generate unique device identifiers as issue center 702 is in charge of specifying unique identifier generating rules, managing and maintaining a master copy of all the generated device identifiers in a uniform manner, e.g., at issuing center 702. This way, more scalability, efficiency, consistency as well as enhanced security can be provided in the process of device identifier assignment and maintenance.

Alternatively, distribution centers 704 and 706 at all levels are configured to receive identifier assignment requests from a management apparatus, and to forward the identifier assignment requests to issuing center 702. In this example, issuing center 702 is configured to generate device identifiers based on the identifier generating rule, and to forward the generated device identifiers via distribution centers 704 and 706 of all levels to identifier recording apparatus. Issuing center 702 can be configured to comprise a server farm or be implemented based on a cloud infrastructure to ensure proper scalability and load balancing for a central point to assign identifies timely.

Figure 8:
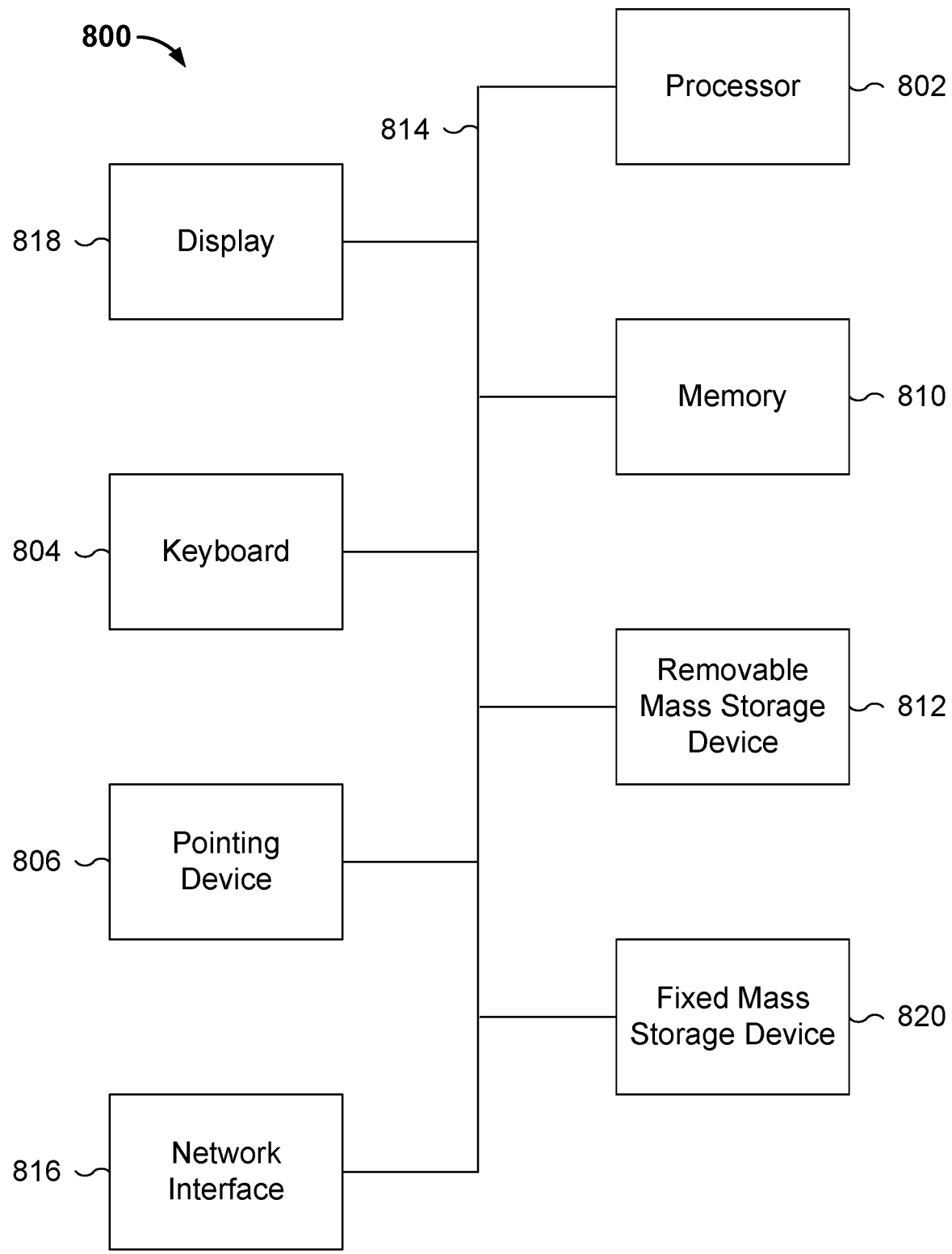
FIG. 8 is a functional diagram illustrating an embodiment of a programmed computer system for generating device identifiers, in accordance with one or more embodiments of the present disclosure.

FIG. 8 is a functional diagram illustrating an embodiment of a programmed computer system for generating device identifiers. As will be apparent, other computer system architectures and configurations can be used to generate device identifiers. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In some embodiments, processor 802 includes and/or is used to provide the launch of a client application based on a message.

Processor 802 is coupled bi-directionally with memory 810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storage 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that the embodiment of the present application can be provided as methods, systems, or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-described are merely embodiments of the present application and do not serve to limit the present application. For persons skilled in the art, the present application may have various alterations and variations. Any modification, equivalent substitution, or improvement made in keeping with the spirit and principles of the present application shall be included within the scope of the claims of the present application. There are many alternative ways of implementing the invention. The disclosed embodiments are illustrative and not restrictive.

What is claimed is:

1. A method for generating device identifiers, comprising:
   receiving an identifier assignment request;
   in response to the received identifier assignment request, assigning a device identifier to a device, the device identifier being a unique identifier, wherein the device is to be assigned with the device identifier;
   transmitting the device identifier to an identifier recording apparatus, wherein the identifier recording apparatus records the device identifier into the device;
   assigning an authorization token corresponding to the device;
   transmitting the authorization token so that the identifier recording apparatus receives the authorization token;
   receiving the authorization token from the identifier recording apparatus;

determining that received authorization token matches with the assigned authorization token; and transmitting the device identifier to the device, wherein the identifier assignment request includes encryption key information, and wherein the transmitted authorization token is encrypted with the encryption key information.

2. The method of claim 1, wherein the assigning of the device identifier to the device comprises:

generating the device identifier based at least in part on device information pertaining to the device, the device information being included in the identifier assignment request.

3. The method of claim 2, wherein the generating of the device identifier comprises generating the device identifier according to a pre-configured identifier generating rule, and wherein the pre-configured identifier generating rule comprises to specify the device identifier in a format comprising a field of a device identifier prefix, a field of a representation of a manufacturer, a field of the device information pertaining to the device, and a field of random numbers.

4. The method of claim 2, wherein the device information pertaining to the device comprises at least one of the following: model information, system version information, and identification information pertaining to a chip of the device.

5. The method of claim 1, wherein the assigning of the authorization token comprises:

generating the authorization token based at least in part on information pertaining to a date, the device, a manufacturer, a random number, or any combination thereof; or retrieving an assignable authorization token from a pool of pre-generated authorization tokens, and assigning the retrieved authorization token as the authorization token, wherein the retrieved authorization token is designated as un-assignable in the pool of pre-generated authorization tokens.

6. The method of claim 5, wherein, after the device identifier is transmitted, the authorization token is designated as invalid or is removed from the pool of pre-generated authorization tokens.

7. The method of claim 1, further comprising recording mapping relationships between the authorization token and a corresponding device identifier; and the transmitting of the device identifier comprises transmitting the device identifier corresponding to the received authorization token based at least in part on the mapping relationships.

8. The method of claim 1, wherein encryption key information included in the identifier assignment request includes a public key; and wherein the received authorization token is encrypted with a private key corresponding to the public key.

9. The method of claim 1, further comprising:

generating encryption key information; and transmitting an entire copy of a partial copy of the generated encryption key information together with the device identifier, wherein:

the entire copy of the generated encryption key information is transmitted when the encryption key information is generated by use of a symmetrical encryption algorithm; and a public key and/or a private key of a public-private key pair is transmitted when the encryption key information is generated.

10. A system for generating device identifiers, comprising:

one or more processors configured to:

receive an identifier assignment request;

in response to the received identifier assignment request, assign a device identifier to a device, the device identifier being a unique identifier, wherein the device is to be assigned with the device identifier;

transmit the device identifier to an identifier recording apparatus, wherein the identifier recording apparatus records the device identifier into the device;

assign an authorization token corresponding to the device;

transmit the authorization token so that the identifier recording apparatus receives the authorization token;

receive the authorization token from the identifier recording apparatus;

determine that the received authorization token matches with the assigned authorization token; and transmit the device identifier to the device, wherein the identifier assignment request includes encryption key information, and wherein the transmitted authorization token is encrypted with the encryption key information; and one or more memories coupled to the one or more processors, configured to provide the one or more processors with instructions.

11. The system of claim 10, wherein the identifier assignment request includes encryption key information, and wherein the one or more processors are further configured to:

encrypt the assigned authorization token with the encryption key information; and transmit the encrypted authorization token.

12. The system of claim 10, wherein to assign the authorization token comprises to:

generate the authorization token based at least in part on information pertaining to a date, the device, a manufacturer, a random number, or any combination thereof; or retrieve an assignable authorization token from a pool of pre-generated authorization tokens, and assign the retrieved authorization token as the authorization token, wherein the retrieved authorization token is designated as un-assignable in the pool of pre-generated authorization tokens.

13. The system of claim 12, wherein, after the device identifier is transmitted, the authorization token is designated as invalid or is removed from the pool of pre-generated authorization tokens.

14. The system of claim 10, wherein the one or more processors are further configured to record mapping relationships between the authorization token and corresponding device identifier; and wherein to transmit the device identifier comprises to transmit the device identifier corresponding to the received authorization token based at least in part on the mapping relationship.

15. The system of claim 10, wherein the one or more processors are further configured to:

generate encryption key information; and transmit an entire copy of a partial copy of the generated encryption key information together with the device identifier, wherein:

the entire copy of the generated encryption key information is transmitted when the encryption key information is generated by use of symmetrical encryption algorithm; and a public key or a private key of a public-private key pair is transmitted when the encryption key information is generated.

16. The system of claim 10, further comprising an issuing center and one or more distribution centers at various levels, wherein:
the issuing center issues an identifier generating rule to the distribution centers at the various levels; the distribution centers at the various levels are configured to receive the identifier assignment request, generate and transmit the device identifier, and report the generated device identifier to the issuing center; or
the distribution centers at the various levels are configured to receive the identifier assignment request, and forward the identifier assigment request to the issuing center, wherein the issuing center is configured to generate the device identifier in accordance with an identifier generating rule and forward the device identifier via the distribution centers at the various levels to the device.

17. The system of claim 10, wherein to assign the device identifier to the device comprises to:
generate the device identifier based at least in part on device information pertaining to the device, the device information being included in the identifier assignment request.

18. The system of claim 17, wherein to generate the device identifier comprises to generate the device identifier according to a pre-configured identifier generating rule, and wherein the pre-configured identifier generating rule comprises to specify the device identifier in a format comprising a field of a device identifier prefix, a field of a representation of a manufacturer, a field of the device information pertaining to the device, and a field of random numbers.

19. The system of claim 17, wherein the device information pertaining to the device comprises at least one of the following: model information, system version information, and identification information pertaining to a chip of the device.

20. The system of claim 10, wherein encryption key information included in the identifier assignment request includes a public key; and wherein the received authorization token is encrypted with a private key corresponding to the public key.

21. A computer program product, the computer program product being embodied in a tangible non-transitory computer readable storage medium and comprising computer instructions for:
receiving an identifier assignment request;
in response to the received identifier assignment request, assigning a device identifier to a device, the device identifier being a unique identifier, wherein the device is to be assigned with the device identifier; and
transmitting the device identifier to an identifier recording apparatus, wherein the identifier recording apparatus records the device identifier into the device;
assigning an authorization token corresponding to the device;
transmitting the authorization token so that the identifier recording apparatus receives the authorization token;
receiving the authorization token from the identifier recording apparatus;
determining that received authorization token matches with the assigned authorization token; and
transmitting the device identifier to the device, wherein the identifier assignment request includes encryption key information, and wherein the transmitted authorization token is encrypted with the encryption key information.

* * * * *